No. 873,670.

PATENTED DEC. 10, 1907.

H. A. & H. W. KEEHN.
ATTACHMENT FOR MOLDS.
APPLICATION FILED APR. 4, 1907.

3 SHEETS—SHEET 1.

WITNESSES
Geo. W. Naylor
Walton Harrison

INVENTORS
Henry A. Keehn
Harry W. Keehn
BY Munn & Co
ATTORNEYS

No. 873,670.

PATENTED DEC. 10, 1907.

H. A. & H. W. KEEHN.
ATTACHMENT FOR MOLDS.
APPLICATION FILED APR. 4, 1907.

3 SHEETS—SHEET 2.

WITNESSES
Geo W Taylor
Walton Harrison

INVENTORS
Henry A. Keehn
Harry W. Keehn
BY Munn & Co
ATTORNEYS

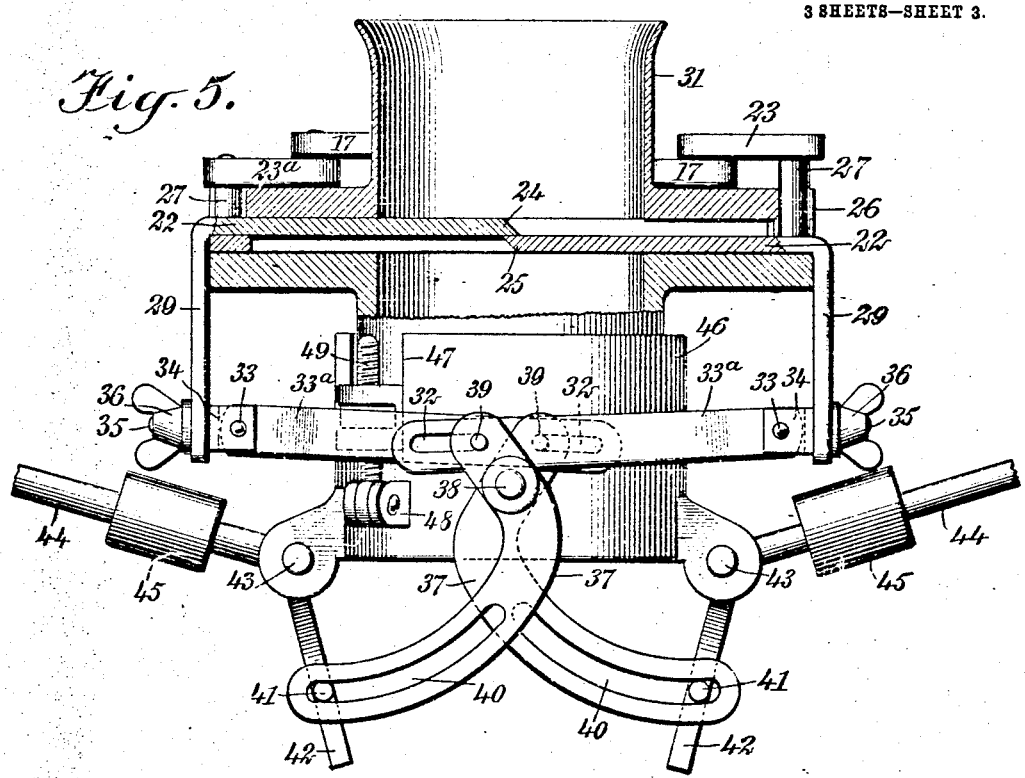
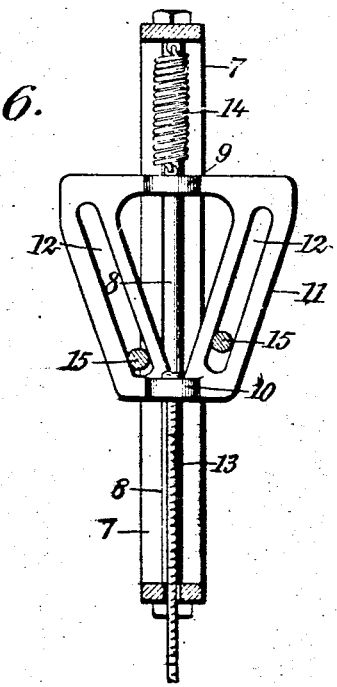

UNITED STATES PATENT OFFICE.

HENRY ANTON KEEHN AND HARRY WALTER KEEHN, OF NEWARK, OHIO.

ATTACHMENT FOR MOLDS.

No. 873,670.  Specification of Letters Patent.  Patented Dec. 10, 1907.

Application filed April 4, 1907. Serial No. 366,325.

*To all whom it may concern:*

Be it known that we, HENRY ANTON KEEHN and HARRY WALTER KEEHN, both citizens of the United States, and residents of Newark, in the county of Licking and State of Ohio, have invented a new and Improved Attachment for Molds, of which the following is a full, clear, and exact description.
Our invention relates to molds and admits of general use, but is of peculiar value in relation to glass press molds, for measuring exactly the quantity of glass required and for delivering the same directly into the mold with a minimum loss of time.

Among other things our invention comprises shears for severing the glass, gage mechanism for measuring the quantity to be severed, and manually-controlled means for operating the shears.

Our invention further consists in various details of construction suitable for carrying out the general idea involved.

Reference is to be had to the accompanying drawings forming a part of this specification, in which similar characters of reference indicate corresponding parts in all the figures.

Figure 1:
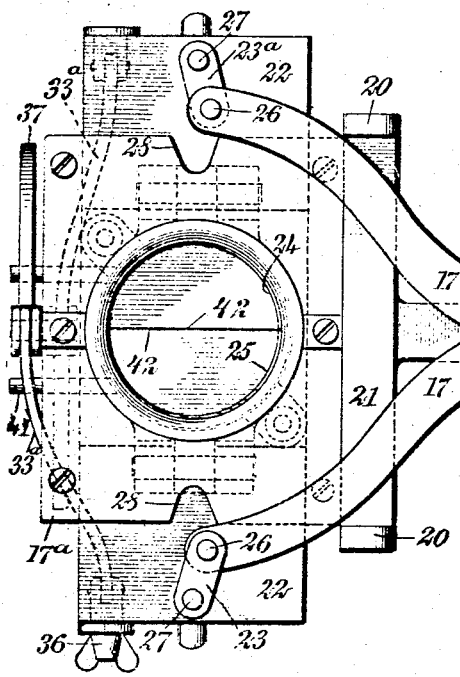
Figure 2:
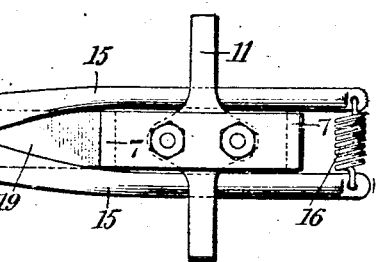
Figure 2:
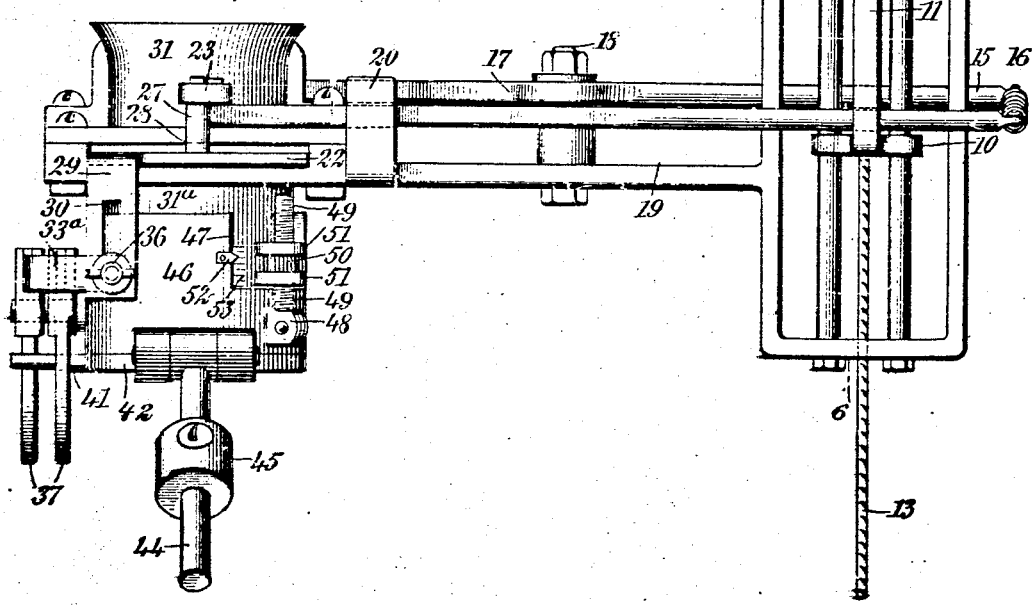
Figure 3:
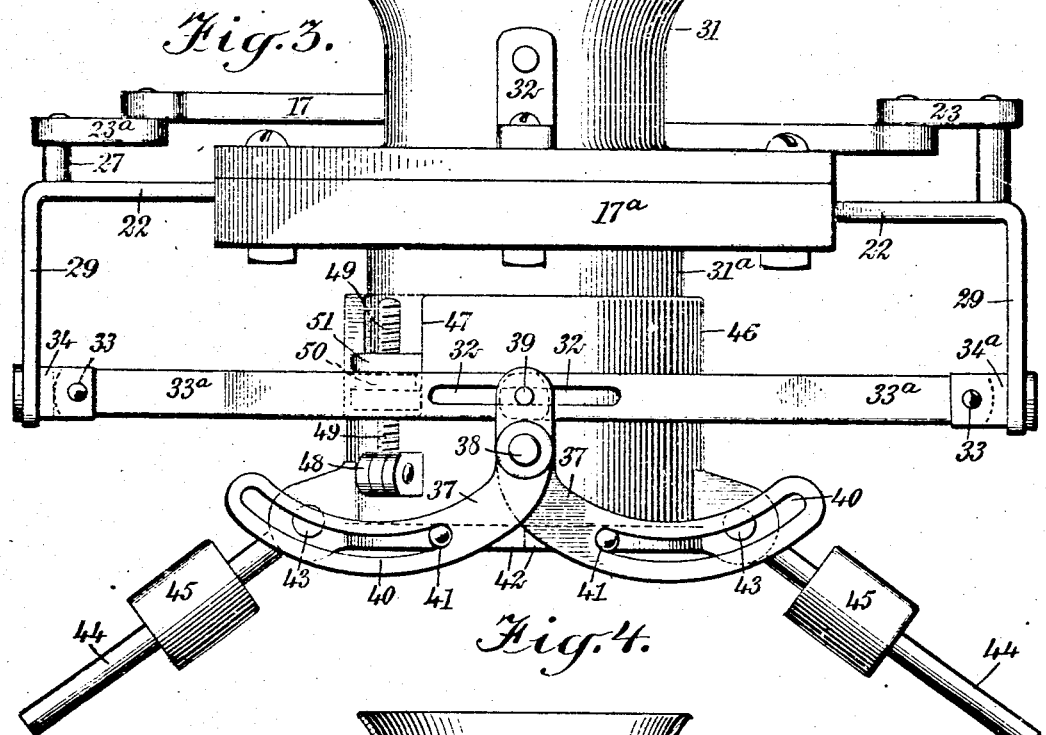
Figure 4:
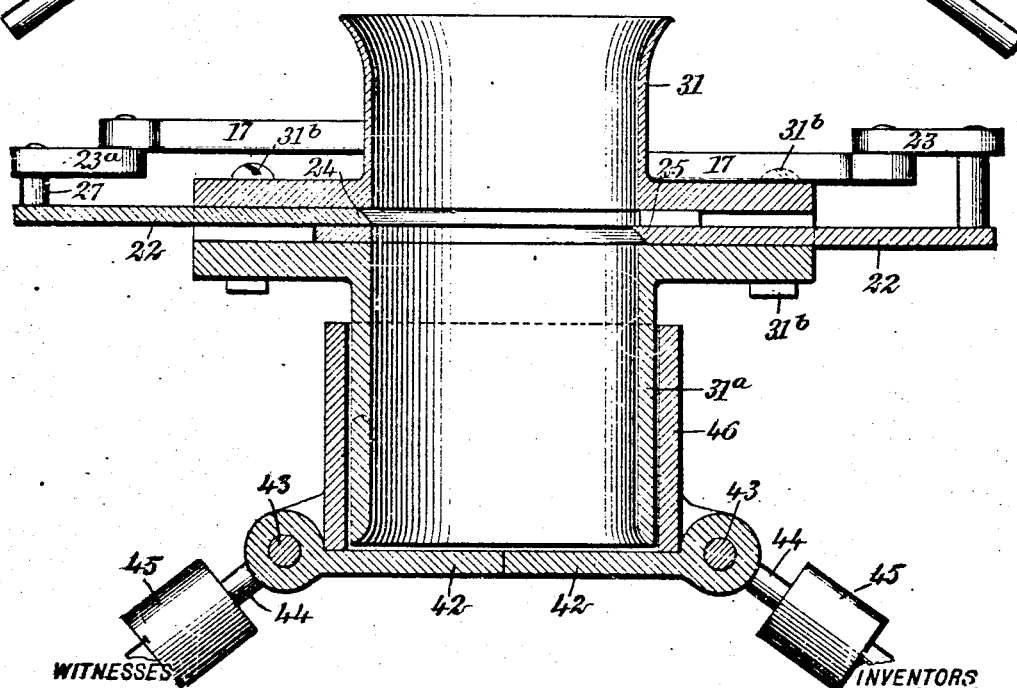

Figure 1 is a plan view of the shears, the frame for holding the same, the limiting stops for preventing excessive movement of the shears, and a cam conveniently used for actuating the latter; Fig. 2 is a side elevation showing the parts just mentioned, and also showing the gage for regulating the volume of glass to be severed, this figure also showing the means for adjusting the gage and the doors which open in order to eject the quantity of glass severed; Fig. 3 is an enlarged elevation taken as from the left of Fig. 2 and showing the arcuate levers for manipulating the doors and also showing the relation of these arcuate levers to the shearing blades and other movable parts connected therewith; Fig. 4 is a vertical central section otherwise similar to Fig. 3, but showing the interior of the gaging cylinder used for containing the glass to be cut, this view further showing the blades of the shears and also the doors for ejecting the glass when severed; Fig. 5 is an elevation somewhat similar to Fig. 4 but partly broken away and showing the movable parts occupying an abnormal position, or, in other words, showing the movable parts in the positions which they occupy after the blades have been brought together; and Fig. 6 is a central vertical section upon the line 6—6 of Fig. 2, looking in the direction of the arrow, and showing the wedge-like cam for operating the shears, this cam being manually controlled.

A rectangular frame 7 is provided with guide rods 8 mounted therein and disposed parallel with each other, as shown at the right of Fig. 2. Mounted upon the guide rods 8 are slides 9, 10 having a cam 11, of substantially keystone shape (see Fig. 6), integral therewith, the cam being provided with slots 12 inclined relatively to each other. A cord 13, or other equivalent flexible connection, is secured to the bottom of this cam. A tensile spring 14 connects the top of the cam with the top of the frame 7 and serves to retract the cam after the latter has been drawn downwardly by the cord 13 and subsequently released.

Shearing levers 17 are provided with straight cylindrical portions 15, the latter being connected together by a tensile spring 16. These levers 17 are mounted upon a pivot 18, as indicated in Fig. 1, so as to be free to rock relatively to each other and to the framework 19. Lugs 20 are mounted upon opposite ends of a rod 21 and integral therewith, this rod being secured firmly upon the framework 19. The lugs 20 serve as limiting stops and prevent excessive outward movement of the adjacent ends of the levers 17.

A slotted head 17ª is fitted with slidably mounted blades 22 connected by links 23, 23ª with the adjacent ends of the levers 17. These blades 22 are provided with cutting edges 24, 25 and are adapted to move toward and from each other so that the cutting edges overlap. Pivot pins 26, 27 are provided for the purpose of connecting the links 23, 23ª with the levers 17 and with the blades 22. The head 17ª is provided with notches 28 for receiving the pivot pins 26, 27, so that when the pivot pins lodge within the notches 28, the latter serve as limiting stops for preventing excessive movements of the blades 22 and levers 17. The blades 22 at their outer edges are each provided with a downwardly projecting lug 29 having a vertically disposed slot 30, as will be understood from Figs. 2 and 3. Each of the lugs 29 is connected at its bottom with a rod 33ª and the two rods 33ª are each provided at the inner end with a slot 32, the slots being adapted to register with each other. Pivot pins 33 are mounted in heads 34, the latter being secured in position by bolts 35 and thumb nuts 36.

Two levers 37, of substantially arcuate form, are crossed and pivoted upon a pin 38. Each lever 37 is provided with a pin 39 and also with an arcuate slot 40. Each arcuate slot 40 receives a pin 41, the latter being mounted upon a semicircular door 42. The two doors 42 are mounted upon pivot pins 43, and are provided with levers 44 having weights 45 adjustably mounted thereupon. The weights are preferably so adjusted as to keep the doors 42 normally closed.

A cylinder 31 is provided with an extension 31$^a$ in alinement therewith, as will be understood from Fig. 4. Encircling the cylindrical extension 31$^a$ is a cup 46 to which the semicircular doors 42 are secured by the pivots 43. The cup 46 is provided with two oppositely disposed slots 47, and adjacent to each slot is a lug 48. Journaled to each of these lugs is a screw 49 provided with a revoluble nut 50, the latter being sandwiched between lugs 51 which are integral with the cylindrical extension 31$^a$. By turning the two nuts 50, the cup 46 is raised or lowered relatively to the cylindrical extension 31$^a$, and hence the internal capacity or volume circumscribed is varied at will.

A pointer 52 is rigidly mounted upon the cup 46 and travels over a graduated scale 53 whenever the cup 46 is raised or lowered. By simply turning the nuts 50 and watching the pointer 52 and scale 53, the operator is enabled to adjust the device so as to cut any predetermined amount of glass.

It will be noted that the heads 34 may, by aid of the slots 30, be adjusted vertically in relation to the lugs 29, and that by this adjustment the virtual length of the rods 33$^a$ may be increased or diminished. Hence, the limit of travel of the levers 37 may be curtailed, so that the doors 42, while always adapted to close the lower end of the cup 46, may not recede very far from each other when they swing apart. In other words, the operator, by adjusting the bolts 35 vertically in relation to the slots through which they pass, can control the degree of opening allowed for the doors 42. It will be further noted that whenever the blades 22 are reciprocated in opposite directions, the lugs 29 cause the rods 33$^a$ to rock the levers 37 and thus open and close the semicircular doors 42.

Our invention is used as follows: The apparatus is placed in such position that the doors 42 are directly over a glass press mold which is to receive the glass. The cup 46 is now adjusted by aid of the gage above described, so that the proper volume or quantity of glass required will be severed. The parts being in their normal condition, the blades 22 will be swing apart, as indicated in Fig. 4, and the doors 42 will necessarily be closed. Moreover, the doors will be effectively locked, owing to the pressure upon the pins 41 by the levers 37 (see Fig. 3). The cylinder 31, with its extension 31$^a$ and cup 46, together now constitute a receptacle. Glass is now run into this receptacle, the upper end of the cylinder 31 being enlarged or made in the form of a hopper to facilitate this purpose. The upper level of the glass may be anywhere between the upper end of the cylinder 31 and the blades 22. The operator now pulls upon the cord 13, for instance by aid of a treadle, or even by hand. This causes the cam 11 to descend. The cylindrical portions 15 of the levers 17 now move outwardly, as will be understood from Fig. 6, and the cutting surfaces 24, 25 of the shearing blades approach and pass each other, so as to make a shearing cut. The slots 32 allow the rods 33$^a$ to move far enough to make this cut without disturbing the positions of the doors 42. After the cutting edges pass each other, or in other words, after the shearing cut is made, however, the rods 33$^a$ continue to engage the pins 39 and rock the levers 37. In doing this, downward pressure is exerted upon the pins 41 and the doors 42 are thereby opened and the severed glass is thus ejected. The pull upon the cord 13 now being relaxed, the spring 14 raises the cam 11 to its normal position, and the levers 17, the shear blades, and all other movable parts immediately connected therewith resume their respective normal positions. This leaves the doors 42 closed and locked, and the shear blades 22 move apart ready to operate upon a new charge of glass.

We find that the apparatus is very positive and reliable in its action, which is practically continuous.

It will be noted that the doors 42 do not begin to open until after the cut is entirely finished, and then these doors open abruptly to a predetermined degree, controllable at the will of the operator.

Having thus described our invention, we claim as new and desire to secure by Letters Patent:

1. The combination of a receptacle, blades connected therewith and adapted to cross said receptacle for the purpose of severing the material contained therein, a cup connected with said receptacle, means for adjusting said cup relatively to said receptacle for the purpose of varying the capacity of said receptacle, doors mounted upon said cup to allow the material to be ejected therefrom, and connections from said doors to said blades for the purpose of maintaining a predetermined working relation between said doors and said blades.

2. The combination of a head, blades slidably mounted therein, rods connected with said blades and provided with slots, levers provided with pivot pins entering said slots, a receptacle provided with doors, said doors being connected with said levers and adapted to be opened and closed thereby, said receptacle being so positioned relatively to said blades that the latter pass through said receptacle for the purpose of severing the material contained therein.

3. The combination of a cylinder, an extension therefor, said extension being separate from said cylinder, cutting mechanism disposed intermediate said cylinder and said extension for the purpose of severing a predetermined quantity of material contained within said extension, a pair of swinging doors normally closing said extension, and means controllable at will for actuating said cutting mechanism and for tripping said doors so as to allow material contained within said extension to drop out of the same.

4. The combination of a cylinder, an extension therefor, cutting mechanism disposed intermediate said cylinder and said extension for the purpose of severing a predetermined quantity of material contained within said extension, and doors connected with said extension for permitting the removal of said material therefrom.

5. The combination of a member serving as a guide for filling in material, an extension for said member, cutting mechanism disposed intermediate said member and said extension, means controllable at will for varying the capacity of said extension, and doors connected with said extension for permitting the removal of said material therefrom.

6. The combination of a guiding member used for filling, an extension therefor, cutting mechanism disposed intermediate said guiding member and said extension, means controllable at will for varying the capacity of said extension, swinging doors connected with said extension for permitting the ejection of material therefrom, connections from said swinging doors to said cutting mechanism to enable said swinging doors and said cutting mechanism to be actuated in a positive relation.

7. The combination of a guiding member used for filling in material, an extension for said guiding member, shearing mechanism disposed intermediate said guiding member and said extension, means controllable at will for varying the capacity of said extension, swinging doors for permitting the ejection of material from said extension, and connections from said swinging doors to said shearing mechanism for enabling said swinging door and said shearing mechanism to be actuated positively in relation to each other.

8. The combination of a guiding member for filling in material, an extension for said guiding member, shearing blades disposed intermediate said guiding member and said extension for the purpose of severing material extending from said guiding member into said extension, means controllable at will for varying the capacity of said extension, swinging doors mounted upon said extension and adapted to open for the purpose of ejecting material therefrom, connections from said swinging doors to said shearing members, and cam mechanism connected with said shearing members and controllable at will for the purpose of actuating said shearing members and said doors.

9. The combination of a receptacle for holding glass in a soft condition, shearing mechanism for severing a predetermined measure of glass material within said receptacle, swinging doors mounted upon said receptacle for temporarily holding said measure of glass therein, and means controllable by movements of said shearing mechanism for opening said doors abruptly after the cut is made by said shearing mechanism.

10. The combination of a receptacle for holding a glass material, swinging doors connected with said receptacle and adapted to permit the ejection of said material from said receptacle, cutting mechanism, and means connected with said cutting mechanism and with said swinging doors and controllable at will for governing the degree of movement of said swinging doors relatively to the degree of movement of said shearing mechanism.

In testimony whereof we have signed our names to this specification in the presence of two subscribing witnesses.

HENRY ANTON KEEHN.
HARRY WALTER KEEHN.

Witnesses:
ROBBINS HUNTER,
STANLEY STOTLER.